United States Patent [19]

Ina et al.

[11] Patent Number: 4,739,483
[45] Date of Patent: Apr. 19, 1988

[54] AUTOMATIC TRANSMISSION CONTROL SYSTEM FOR AN AUTOMOBILE

[75] Inventors: Toshikazu Ina, Nukata; Hisasi Kawai, Toyohashi; Syuzaburo Tashiro; Hideki Obayashi, both of Okazaki; Tokio Kohama, Nishio, all of Japan

[73] Assignee: Nippon Soken, Inc., Nishio, Japan

[21] Appl. No.: 636,603

[22] Filed: Aug. 1, 1984

[30] Foreign Application Priority Data

Aug. 5, 1983 [JP] Japan ................. 58-143992

[51] Int. Cl.⁴ ............................. B60K 41/08
[52] U.S. Cl. ..................... 364/424.1; 74/866; 74/863; 123/480
[58] Field of Search .......... 364/424.1; 123/480; 74/863, 866, 75 D, 336 R, 337

[56] References Cited

U.S. PATENT DOCUMENTS

| | | | |
|---|---|---|---|
| 4,217,795 | 8/1980 | Sugasawa et al. | 74/863 |
| 4,245,605 | 1/1981 | Rice et al. | 123/480 |
| 4,318,312 | 3/1982 | Morimoto et al. | 74/863 |
| 4,463,629 | 8/1984 | Himmelstein | 74/866 |
| 4,474,081 | 10/1984 | Kinugasa et al. | 74/866 |
| 4,492,112 | 1/1985 | Igarashi et al. | 364/424.1 |
| 4,539,643 | 9/1985 | Suzuki et al. | 364/424.1 |
| 4,539,868 | 9/1985 | Habu | 364/424.1 |
| 4,564,906 | 1/1986 | Stephan et al. | 364/424.1 |

*Primary Examiner*—Parshotam S. Lall
*Attorney, Agent, or Firm*—Cushman, Darby & Cushman

[57] ABSTRACT

The flow rate of intake air in an engine, engine speed, and automobile speed are detected. The speed-change ratio of a transmission is determined and adjusted in response to a signal which is proportional to the detected intake air flow rate and inversely proportional to the detected engine speed, and in response to the detected automobile speed.

19 Claims, 5 Drawing Sheets

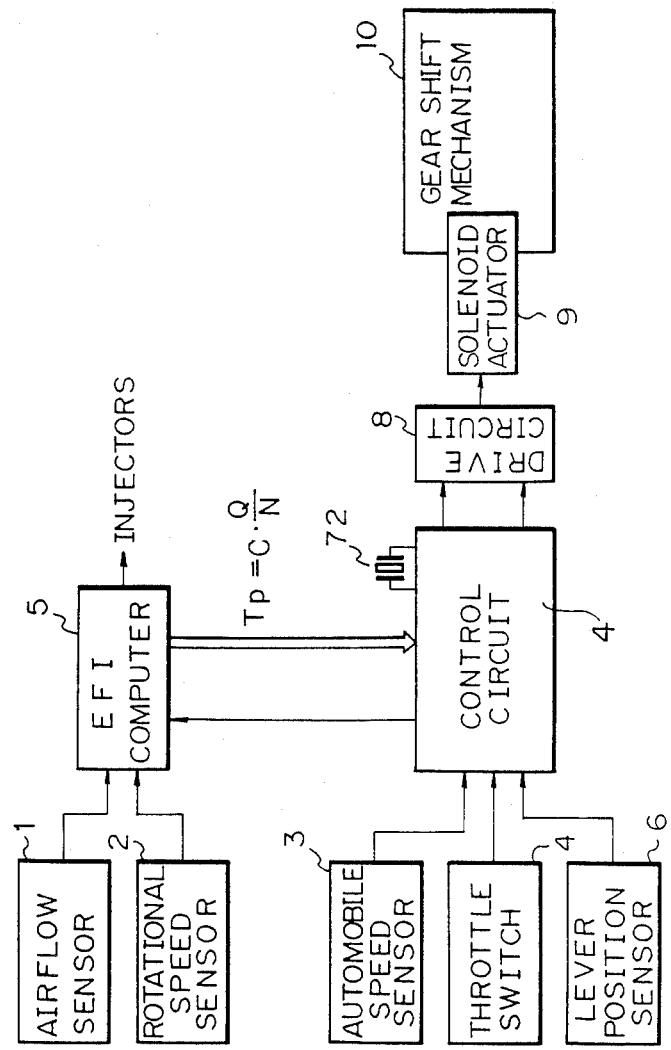

AUTOMATIC TRANSMISSION CONTROL SYSTEM FOR AN AUTOMOBILE

BACKGROUND OF THE INVENTION

1. Field of the Invention

The present invention relates to a control system for an automatic transmission of an automobile, particularly to a control system for automatically controlling the gear position of the transmission.

2. Description of the Prior Art

In conventional automatic transmission control systems, the gear position is automatically shifted based on a predetermined shift pattern, in accordance with the automobile speed, sensed by an automobile speed sensor, and with the throttle valve position, sensed by a throttle angle sensor.

The best gear position differs depending upon the engine torque and automobile speed. Therefore, ideally, the gear position should be shifted in accordance with engine torque and automobile speed. Since is difficult to measure engine torque, conventional systems have used the throttle valve position instead. The throttle valve position, however, does not perfectly reflect the engine torque. For example, engine aging sometimes results in a difference between the throttle valve position and the engine torque. This in turn results in control of the gear position out of correspondence with the true change of the engine load, decreasing driving efficiency. When the engine is running on a very lean gasoline mixture in response to certain engine conditions, the driveability becomes particularly poor.

SUMMARY OF THE INVENTION

It is, therefore, an object of the present invention to provide an automatic transmission control system which can control the gear position to correct positions in response to changes in the engine load.

Another object of the present invention is to provide an automatic transmission control system which can prevent deterioration of driveability of an automobile with a lean-burn engine and can achieve good driving efficiency.

According to the present invention, the above objects are achieved by a control system for a transmission of an automobile having an engine comprising: means for sensing an amount of intake air in the engine; means for sensing a rotational speed of the engine; means for sensing a running speed of the automobile; means for providing an output proportional to the sensed amount of intake air and inversely proportional to the sensed rotational speed; means for determining a speed-change ratio of the transmission in response to the output and the sensed running speed; and means for electrically effecting the determined speed-change ratio of the transmission in response to an output of the ratio determining means.

BRIEF DESCRIPTION OF THE DRAWINGS

FIG. 4 is a block diagram of another embodiment of the present invention;

DESCRIPTION OF THE PREFERRED EMBODIMENTS

Figure 1:
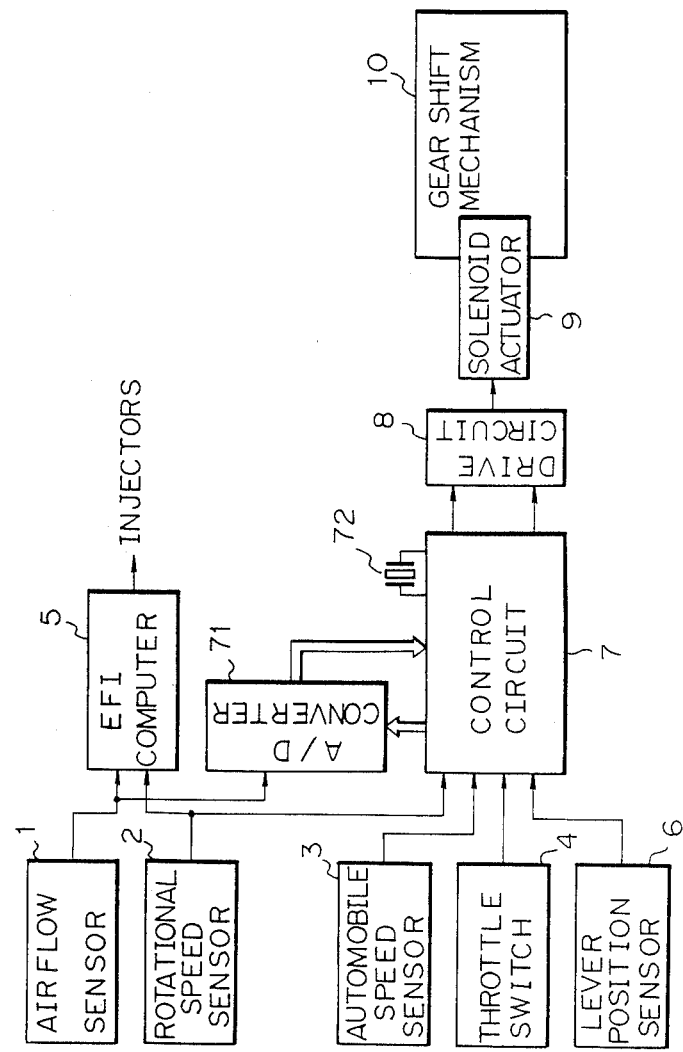
FIG. 1 is a block diagram of an embodiment of the present invention.

FIG. 1 illustrates the constitution of an embodiment according to the present invention.

This embodiment concerns an automatic two-speed forward transmission which automatically controls the gear position based on a shift pattern determined depending upon the automobile speed and intake air flow rate Q divided by an engine speed N.

In FIG. 1, reference numeral 1 denotes a well-known air flow sensor for sensing the amount of intake air. This air flow sensor 1 varies the opening degree of its vane in accordance with the amount of intake air and detects the opening degree by a potentiometer.

An engine speed sensor 2 disposed in a distributor (not shown) has a rotatable magnetic disk with projections and an electromagnetic pick-up coil. This engine speed sensor 2 produces a signal having a frequency proportional to the engine speed.

An automobile speed sensor 3 for sensing the running speed of the automobile has a rotatable magnetic disk with projections and an electromagnetic pick-up coil. The magnetic disk rotates with the rotation of the wheels of the automobile. A signal having a frequency proportional to the vehicle speed is produced from the electromagnetic pick-up coil.

A throttle switch 4 is driven by an operation shaft of a throttle valve (not shown), which cooperates with an accelerator pedal (not shown). When the opening degree of the throttle valve exceeds a predetermined value, the throttle switch 4 outputs a voltage signal.

An electronic fuel injection (EFI) computer 5, a well known control computer in an EFI control device, calculates a basic injection amount by dividing the flow rate Q of intake air by the engine speed N. Then, the EFI computer 5 corrects the calculated basic injection amount in accordance with the change in the power supply voltage and whether the current condition is the starting condition so as to obtain a final injection amount. The EFI computer 5 is well known, so no detailed explanation thereof is provided.

A lever position sensor 6 senses the position of a lever of an automatic transmission and produces range signals corresponding to a D range for executing automatic gear shift, P range for parking, N range for holding the gear at a neutral position, L range for holding the gear at a lower speed position, and R range for running backward.

An analog-to-digital (A/D) converter 71 converts the voltage signal Q from the air flow sensor 1 to a digital signal.

A control circuit 7, which has a microcomputer for executing digital processing in accordance with a predetermined shift control program, is connected to a quartz oscillator 72 which produces a signal of several MHz. When an engine key switch (not shown) is turned on, a constant voltage of 5 V is supplied to the control circuit 7 from a stabilized power supply circuit (not shown). The control circuit 7 thereby begins operation, repeatedly carrying out a predetermined processing at intervals of about 100 msec to produce a control instruction for automatic shift control.

Although not shown, the microcomputer includes a read-only memory (ROM) for storing a shift control program which instructs operation steps for the automatic gear shift control, a central processing unit (CPU), a random-access memory (RAM), a clock circuit, an interface circuit, and an input/output (I/O) circuit.

The CPU reads out in sequence the shift control program from the ROM and executes the operation process in accordance with the steps of the read shift control program.

The RAM temporarily stores various data related to the operation process of the CPU. The stored data can be read out from the RAM in response to instructions from the CPU.

The clock circuit produces standard clock pulses used for various operations based upon the signal from the quartz oscillator 72.

The interface circuit shapes waveforms of signals from the afore-mentioned sensors and produces instruction signals applied to a drive circuit 8 in accordance with output from the CPU.

The I/O circuit connects the interface circuit with a bus line.

A solenoid-type actuator 9 is connected via the drive circuit 8 to the control circuit 7. The actuator 9 drives a gear shift mechanism 10 to shift the gear position of the automatic transmission in response to a drive signal from the drive circuit 8.

Hereinafter, the operation of the afore-mentioned embodiment will be described.

Figure 2:
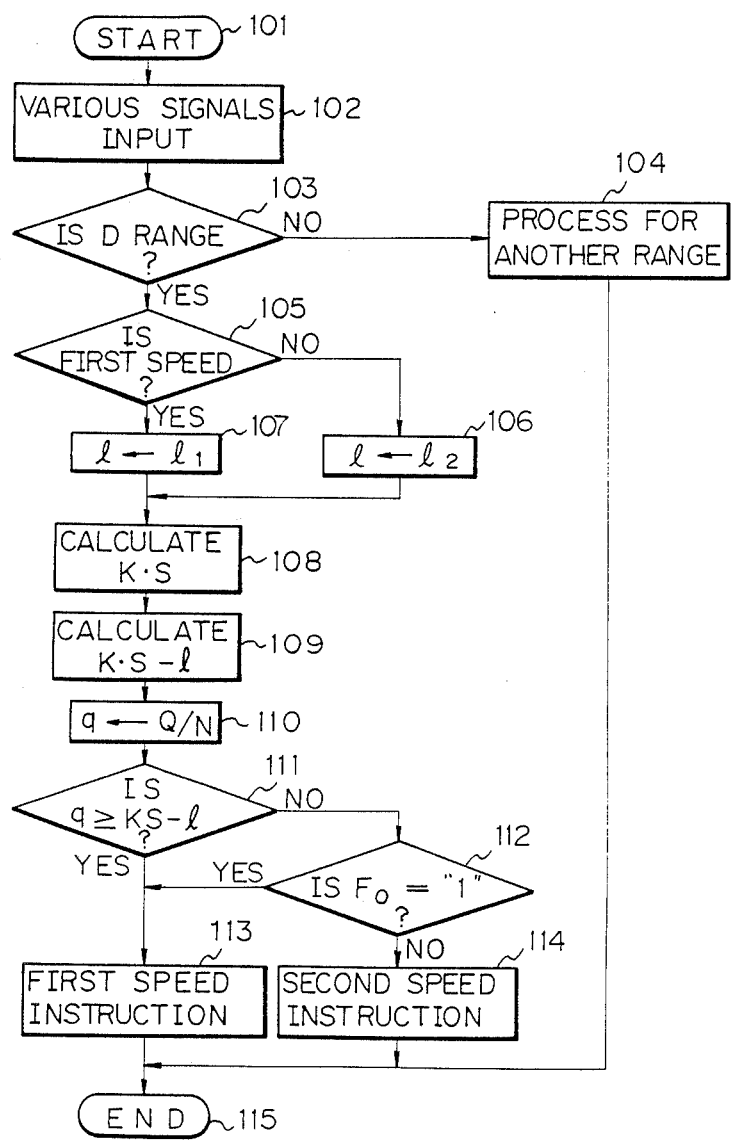
FIG. 2 is a flow chart of a control program of the embodiment of FIG. 1.

When the engine key switch is turned on, the power supply circuit operates and thus the control circuit 7 including the microcomputer starts the operation process shown in FIG. 2. Namely, the control circuit 7 executes the process from start point 101 of FIG. 2 at intervals of about 100 msec.

At point 102, various signals are input to the control circuit 7. Namely, a binary signal which is converted from the voltage signal by the A/D converter 71 and indicates the amount Q of intake air, a binary signal indicating engine speed N, a binary signal indicating automobile speed S, a binary signal from the throttle switch 4, and a binary signal from the lever position sensor 6 are input at point 102.

At point 103, it is judged whether the position of the lever of the automatic transmission is in the D range, in accordance with the signal from the lever position senso 6. When the engine key switch is turned on, since the lever position is in the N range or the P range, the judgement will be "NO", causing the program to proceed to point 104, wherein a predetermined proess for that range will be executed. Then, the program proceeds to end point 115. The above-mentioned sequence of steps from point 101 to 115 via 102, 103, and 104 is repeated at predetermined intervals until the lever position is changed to the D range in order to run the vehicle. In this case, no instruction signal is applied to the drive circuit 8 and thus the solenoid actuator 9 for shifting the gear position to 1st or 2nd speed is not energized.

When the lever position is changed to the D range for running the automobile, the lever position sensor 6 detects this and produces a D range signal. Therefore, in this case, the judgement at point 103 will become "YES" and the program will proceed to point 105. At point 105, whether the gear position is in a first speed is judged by checking if a first speed instruction signal was produced in the least processing cycle. In a processing cycle executed just after the lever position changed to the D range, the judgement will be "NO" because a first speed instruction signal is not produced. Therefore, in this case, the program proceeds to point 106, wherein a value l is equalized to a second set value $l_2$, whereupon the program proceeds to point 108. At point 108, calculation of K·S is executed. Namely, the automobile speed S input at point 102 is multiplied by a coefficient K which indicates the slope of a linear function. At the next point 109, the calculated value K·S is decreased by the value l. Namely, calculation of (K·S−l) is executed. Then, at point 110, the amount q of intake air during one engine revolution is calculated by dividing the air flow amount Q by the engine speed N. Namely, calculation of $q=Q/N$ is executed. Then, at point 111, whether the calculated intake air amount per one engine q revolution, in other words, the amount q of intake air for one cylinder, is greater than (or equal to) the value of (K·S−l) calculated at point 109 is judged. If the automobile speed is zero, the judgement at point 111 will be "YES" and the program will proceed to point 113, wherein a first speed instruction signal is produced. The drive circuit 8 holds this first speed instruction signal and produces a drive signal for energizing the solenoid actuator 9 to drive the gear shift mechanism 10 so that the gear position of the transmission is shifted to the first speed. Thus, the automobile is in a condition able to start running.

Figure 3:
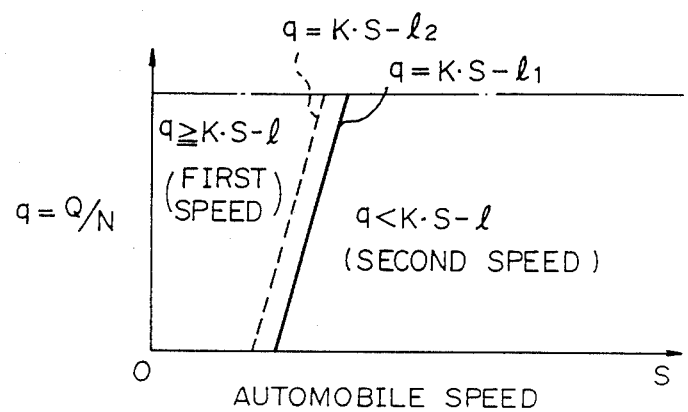
FIG. 3 is a diagram of a shift pattern in the embodiment of FIG. 1.

Accordingly, in subsequent processing cycles, the judgement of the first speed at point 105 will be "YES", and the program will proceed to point 107 wherein a value l is equalized to a first set value $l_1$. Then, the steps at points 108, 109, 110, 111, and 113 will be repeated at predetermined intervals so that the gear position is held on the first speed position, enabling the automobile to start smoothly. In this case, the linear function of $q=K\cdot S-l$ is represented by a solid line ($q=K\cdot S-l_1$) in FIG. 3, and the relation between the automobile speed S and the amount of intake air per one cylinder q lies in a left side region with respect to the linear function of $q=K\cdot S-l_1$.

After start of running, when the automobile speed increases and the calculated value of (K·S−$l_1$) exceeds the amount of intake air per one cylinder q, the judgement of the region at point 111 becomes "NO" and the program proceeds to point 112.

At point 112, it is judged whether a throttle switch signal $F_\theta$ is "1" or not, namely whether the throttle valve has opened greater than a predetermined degree. If "YES", the program proceeds to point 113 to output the first speed instruction signal. If "NO", the program proceeds to point 114 to output a second speed instruction signal, whereby the gear position is shifted to the second speed position. It should be noted that point 112 checks whether a kick down operation is to be executed or not. Namely, in the second speed gear position, if the throttle valve opens greatly, the throttle switch signal $F_\theta$ changes to "1" and, thus, the gear position is changed to the first speed position.

When the second speed instruction signal is produced at point 114, the drive circuit 8 holds this and deenergizes the solenoid actuator 9 to drive the gear shift mechanism 10 so as to shift the gear position to the second speed position. Thus, the automobile is in a condition for high speed running.

In subsequent processing cycles, the judgement of the first speed at point 105 will be "NO" and thus the program will proceed to point 106, wherein the value l is equalized to the second set value $l_2$. Thereafter, the steps of points 108, 109, 110, 111, 112, and 114 will be repeated at predetermined intervals so as to keep the gear position in the second speed position, enabling the automobile to effectively run. In this case, the relation between the automobile speed and the amount of intake air per one cylinder lies in a right side region of the shift pattern in FIG. 3. The linear function in the case changes to $q=K\cdot S-l_2$, shown by a broken line, so as to obtain a hysterisis characteristic for the shift pattern. Namely, the shift pattern for downward shift is bordered by $q=K\cdot S-l_2$, and the shift pattern for upperward shift is bordered by $q=K\cdot S-l_1$ to obtain a hysterisis characteristic.

In the above-mentioned embodiment, the shift pattern is represented by a linear function. However, shift patterns of nonlinear functions or discontinuous line functions can be used for controlling the gear position.

Furthermore, the number of gear positions can be freely selected, for example, to three speed or four speed, although the number of solenoid actuators will increase accordingly.

FIG. 4 illustrates the constitution of another embodiment according to the present invention. In this embodiment, the A/D converter 71 in the embodiment of FIG. 1 is omitted. The control circuit 7 of this embodiment receives a signal indicative of the basic fuel injection amount $T_p$ from the EFI computer 5 and does not calculate the amount of intake air per one cylinder q. Other constitutions of the embodiment of FIG. 4 are the same as those of the embodiment of FIG. 1.

In the EFI computer 5, a final injection amount $\tau$ is calculated by $$\tau = C \cdot (Q/N) \cdot (C_1 + C_2 + \ldots + C_n)$$
$$= T_p \cdot (C_1 + C_2 + \ldots + C_n)$$

where C is an air-fuel ratio coefficient, $C_1, C_2, \ldots, C_n$ are coefficients of warming-up enrichment after start enrichment, acceleration enrichment, etc. The air-fuel ratio coefficient C is adjusted in response to the engine torque to control the air-fuel ratio to a lean condition (for example, A/F=16) which is leaner than a stoichiometric condition (A/F=14.5). When the change in the engine torque is great, the air-fuel ratio coefficient C is decreased, causing the air-fuel ratio to be small, and vice versa.

Figure 5:
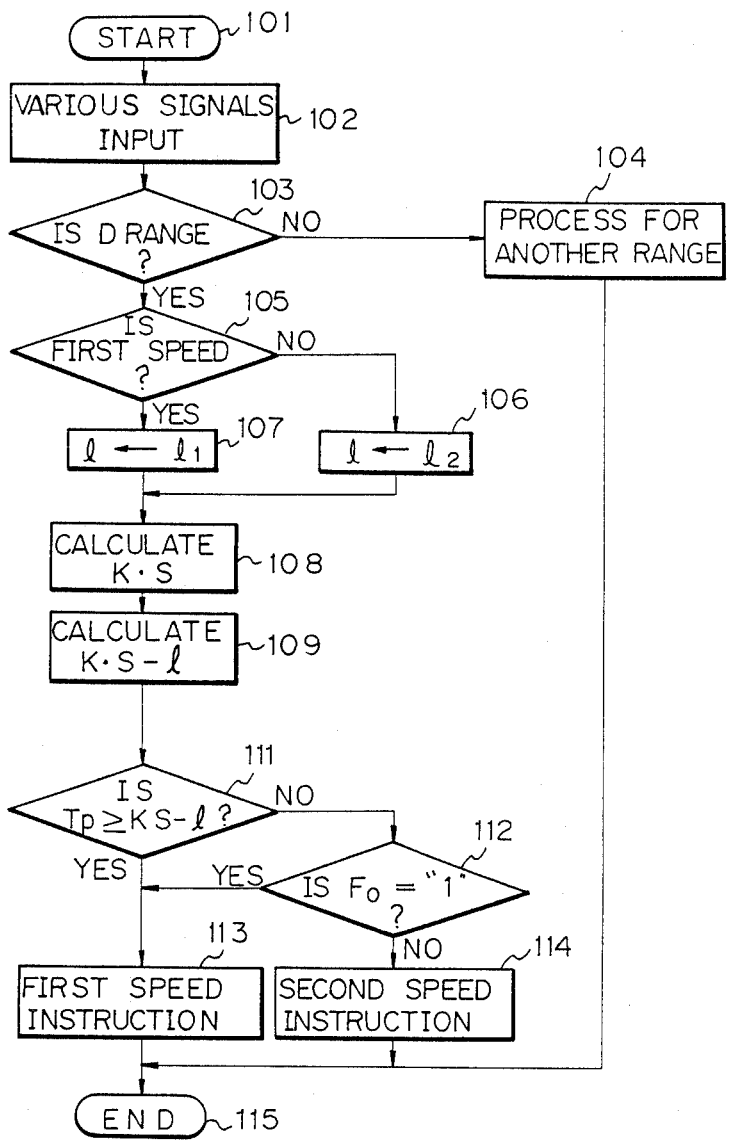
FIG. 5 is a flow chart of a control program of the embodiment of FIG. 4.

FIG. 5 shows a control program of this embodiment. The control program of FIG. 5 is substantially the same as that of FIG. 2, except that the step at point 110 in FIG. 2 is omitted and at point 111 $T_p$ is used instead of q.

Figure 6:
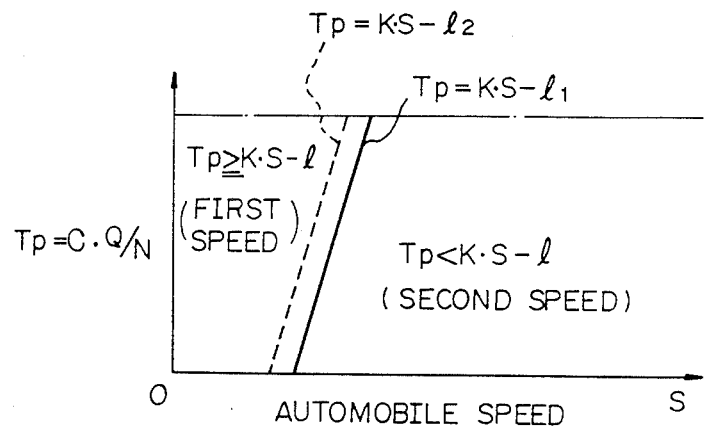
FIG. 6 is a diagram of a shift pattern in the embodiment of FIG. 4.

According to this embodiment, since the shift pattern is determined by the relation between the automobile speed and the basic injection amount $T_P$, which changes the air-fuel ratio, as shown in FIG. 6, an optimum gear position depending upon engine torque change can be selected. Therefore, good driveability for an automobile with a lean-burn engine can be obtained.

Many widely different embodiments of the present invention may be constructed without departing from the spirit and scope of the present invention. It should be understood that the present invention is not limited to the specific embodiments described in this specification, except as defined in the appended claims.

What is claimed is:

1. A control system for a transmission of an automobile having an engine comprising:
    means for sensing a parameter indicative of intake air supplied to said engine;
    means for sensing a rotational speed of said engine;
    means for sensing a running speed of said automobile;
    means for calculating (1) a load output proportional to said sensed parameter indicative of intake air, and inversely proportional to said sensed rotational speed, and (2) a coefficient proportional to an air-fuel ratio;
    means for determining a speed-change ratio of said transmission in response to said load output and said air-fuel ratio coefficient wherein said ratio determining means includes:
    means for determining a gear position of said transmission;
    means for comparing said output with at least one value which changes depending upon said sensed running speed and the determined gear position; and
    means for determining one of the gear positions of said transmission in accordance with the result of said comparing; and
    means for electrically effecting said determined speed-change ratio of said transmission in response to an output of said ratio determining means.

2. A control system as claimed in claim 1, wherein said engine includes means for controlling an amount of fuel injection to said engine in response to said sensed parameter indicative of intake air and said sensed rotational speed.

3. An apparatus as in claim 1 wherein said first signal is proportional to one of a pressure of intake air and a flow rate of intake air.

4. An apparatus as in claim 1 and further comprising means for adjusting a speed-change ratio of said transmission to said determined speed-change ratio from said processing means.

5. In combination with a fuel control system having means for sensing an amount of air intake in an engine of an automobile, means for sensing a rotational speed of said engine, means for calculating an amount of fuel in response to said sensed amount of intake air and said sensed rotational speed, said fuel amount calculation means including EFI computer means for determining basic amount of fuel injection (Tp) based on an air-fuel ratio calculated in correspondence with a value (A) indicating a state of air intake, an engine rotational speed, and an engine torque, means for producing a signal proportional to an air-fuel ratio and a value (A) indicating the state of air intake and inversely proportional to the engine rotational speed, and means for supplying said engine with fuel in proportion to said calculated amount of fuel in proportion to an amount of fuel calculation by said fuel injection amount determination means, a control system for a transmission of said automobile comprising:
    means for sensing a running speed of said automobile;
    means for determining a speed-change ratio of said transmission in response to said sensed running speed and said basic fuel injection amount ($T_p$); and
    means for electrically effecting said determined speed-change ratio of said transmission in response to an output of said ratio determining means.

6. An apparatus as in claim 5 wherein said value (A) indicating said state of air intake is one of a pressure of intake air and a flow rate of intake air.

7. A control system as claimed in claim 5, wherein said fuel-amount determining means includes means for determining an amount of fuel proportional to said sensed amount of air and inversely proportional to said sensed rotational speed.

8. A control system as claimed in claim 5, wherein said ratio determining means includes means for determining one of the gear positions of said transmission in response to said output and said sensed running speed.

9. A control system as claimed in claim 5, wherein said ratio determining means includes:
   means for comparing said output with at least one value which changes depending upon said sensed running speed; and
   means for determining a speed-change ratio of said transmission in accordance with the result of said comparison.

10. A control system as claimed in claim 9, wherein said at least one value changes in proportion to said sensed running speed.

11. A control system as claimed in claim 9, wherein said ratio determining means includes means for determining one of the gear positions of said transmission in accordance with the result of said comparison.

12. A control system as claimed in claim 11, wherein said at least one value changes depending upon the determined gear position.

13. A control system for a transmission of an automobile having an engine comprising:
   means for sensing a parameter indicative of air intake in the engine;
   means for sensing a rotational speed of the engine;
   means for sensing a running speed of the automobile;
   processing means for (1) producing a first signal porportional to said sensed parameter indicative of intake air and inversely proportional to said sensed rotational speed, (2) calculating an air-fuel ratio, (3) calculating a basic fuel injection amount based on said air-fuel ratio and said first signal and (4) determining a speed-change ratio of said transmission based on said basic fuel injection amount.

14. An apparatus as in claim 13 wherein said first signal is proportional to one of a pressure of intake air and a flow rate of intake air.

15. A control system as claimed in claim 13, wherein said processing means includes a function for determining one of the gear positions of said transmission in response to said first signal and said sensed running speed.

16. A control system as claimed in claim 13, wherein said processing means includes functions for comparing said first signal with at least one second signal which changes depending upon said sensed running speed and for determining a speed-change ratio of said transmission in accordance with the result of said comparison.

17. A control system as claimed in claim 16, wherein said at least one second signal changes depending upon the determined speed-change ratio.

18. A control system as claimed in claim 16, wherein said at least one second signal changes in proportion to said sensed running speed.

19. A method for controlling a transmission of an automobile having an engine, comprising the steps of:
   determining if a transmission is operating in a first transmission speed, and setting a first correction factor to equal a first value when said transmission is in said first transmission speed;
   determining if said transmission is in a second transmission speed and setting said first correction factor equal to a second value when said transmission is in said second transmission speed;
   calculating a control value based on a speed of said automobile and said first correction factor;
   determining an air fuel ratio;
   determining a load Q/N of said engine based on a state of air intake, and engine rotational speed;
   calculating a basic fuel injection amount $T_P$ based on said air fuel ratio and said load;
   determining if said basic fuel injection amount $T_P$ is greater than said control value; and
   commanding said transmission to said first transmission speed when $T_P$ is in a first predetermined relation with said control value and to said second transmission speed when $T_P$ is in a second predetermined relation with said control value.

* * * * *